(12) United States Patent
Koduri et al.

(10) Patent No.: US 10,888,918 B2
(45) Date of Patent: Jan. 12, 2021

(54) STACKED AND CORED LOCATOR BRAKE CALIPER

(71) Applicant: MANDO CORPORATION, Gyeonggi-do (KR)

(72) Inventors: Suresh Babu Koduri, Novi, MI (US); Daniel Alan Smith, White Lake, MI (US); Antonio Eduardo Demorais, Novi, MI (US)

(73) Assignee: MANDO CORPORATION, Gyeonggi-Do (KR)

( * ) Notice: Subject to any disclaimer, the term of this patent is extended or adjusted under 35 U.S.C. 154(b) by 122 days.

(21) Appl. No.: 15/963,951

(22) Filed: Apr. 26, 2018

(65) Prior Publication Data
US 2019/0329318 A1    Oct. 31, 2019

(51) Int. Cl.
| B22C 9/10 | (2006.01) |
|---|---|
| B22C 9/22 | (2006.01) |
| F16D 55/226 | (2006.01) |
| F16D 65/095 | (2006.01) |
| F16D 65/18 | (2006.01) |
| F16D 121/04 | (2012.01) |
| F16D 125/04 | (2012.01) |

(52) U.S. Cl.
CPC ............ B22C 9/22 (2013.01); F16D 55/226 (2013.01); F16D 65/095 (2013.01); F16D 65/18 (2013.01); F16D 2121/04 (2013.01); F16D 2125/04 (2013.01); F16D 2250/003 (2013.01); F16D 2250/0015 (2013.01)

(58) Field of Classification Search
CPC .......... B22C 9/06; B22C 9/22; B22D 31/002; F16D 55/226; F16D 55/228; F16D 65/0068; F16D 65/095; F16D 65/18
USPC ................... 188/73, 1, 73.31, 370; 164/113, 164/132–137, 28, 369; 29/527.6
See application file for complete search history.

(56) References Cited

U.S. PATENT DOCUMENTS

| 5,518,062 A * | 5/1996 | Kobayashi ............... B22C 9/10 164/137 |
|---|---|---|
| 6,598,655 B2 | 7/2003 | Newcomb et al. |
| 7,168,529 B2 | 1/2007 | Morais et al. |
| 8,132,612 B2 | 3/2012 | Morais et al. |
| 9,737,929 B2 * | 8/2017 | Morais ............... F16D 65/0068 |
| 9,873,149 B2 * | 1/2018 | Arai .......................... B22C 9/22 |
| 2016/0158830 A1 | 6/2016 | Morais et al. |

* cited by examiner

Primary Examiner — Christopher P Schwartz
(74) Attorney, Agent, or Firm — Ladas & Parry, LLP

(57) ABSTRACT

Brake calipers, molds and method of producing brake calipers are disclosed including a brake caliper mold for molding a brake caliper, the brake caliper mold comprising: a first mold section; a second section half; a core member configured to form a piston bore, the core member comprising: a tower configured to form a tower window in a bridge of the brake caliper and a piston bore extension to form a piston bore of the brake caliper; and four locator forming surfaces located on the tower, each of the four locator forming surfaces configured to form a separate lateral data reference surface on the brake caliper, the lateral data reference surfaces capable of being used for subsequent machining of the brake caliper to predetermined tolerances.

29 Claims, 12 Drawing Sheets horizontal

STACKED AND CORED LOCATOR BRAKE CALIPER

TECHNICAL FIELD

This disclosure relates to brake systems and brake calipers as well as to molds for brake calipers and methods of making brake calipers.

BACKGROUND

Brake systems, such as disk brake systems on vehicles such as cars and trucks, can include calipers and pistons within the calipers. Calipers can be made by many different processes, but one method includes molding the caliper followed by machining various portions of the caliper to meet the specified tolerances. In some cases, the piston bore, which is an area that receives a brake piston is machined as well as various other surfaces. Frequently, it can be desirable to design the caliper and the molding process to require less machining or less machining of portions such as the piston bore. It can also be desirable to arrange the location and position of caliper casting positions within a mold to increase the number of calipers cast within a specified size of mold.

SUMMARY

In a first aspect disclosed herein, a brake caliper mold for molding a brake caliper is provided. The brake caliper mold comprising: a first mold section; a second section half; a core member configured to form a piston bore, the core member comprising: a tower configured to form a tower window in a bridge of the brake caliper and a piston bore extension to form a piston bore of the brake caliper; and four lateral locator forming surfaces located on the tower, each of the four lateral locator forming surfaces configured to form a separate data reference surface on the brake caliper, the data reference surfaces capable of being used for subsequent machining of the brake caliper to predetermined tolerances, wherein, brake caliper mold is configured to form a rotor space in the brake caliper wherein a brake rotor is received when the brake caliper is installed on a vehicle.

In a second aspect disclosed herein, a brake caliper is provided. The brake caliper comprising: inboard and outboard legs connected by a bridge and having a rotor space between the inboard and outboard legs configured to receive a brake rotor when the caliper is installed on a vehicle, wherein the inboard leg comprises a piston bore and the outboard leg comprises fingers configured to hold a brake pad; the bridge comprising a tower window, the tower window being defined by interior surfaces, the tower window having four data reference surfaces present on the interior surfaces capable of being used for machining of the brake caliper to predetermined tolerances.

In a third aspect disclosed herein, a method of producing a brake caliper is provided. The method comprising: supplying a suitable casting material to a mold so as to form a cast brake caliper within the mold, wherein, the mold comprises: a first mold section; and a second mold section meeting at a split line, wherein a core is disposed within the mold, the core comprising: a tower configured to define a window in a bridge of the cast brake caliper and a piston bore extension to define a piston bore of the cast brake caliper, the tower comprising: four lateral locator forming surfaces, each of the four lateral locator forming surfaces configured to form a separate data reference surface on the cast brake caliper, the data reference surfaces capable of being used for subsequent machining of the cast brake caliper to predetermined tolerances; and removing the cast brake caliper from the mold, wherein the cast brake caliper includes the four data reference surfaces located on one or more surfaces defining a tower window; and machining the cast brake caliper using the four data reference surfaces as datum surfaces to thereby produce the brake caliper, wherein the brake caliper has a rotor space configured to receive a brake rotor when the caliper is installed on a vehicle.

In a fourth aspect disclosed herein, a method of producing a pair of brake calipers is provided, the method comprising: supplying a suitable casting material to a mold so as to form a first and a second cast brake caliper within the mold, wherein, the mold comprises: a first mold section; and a second mold section meeting at a split line, wherein a core is disposed within the mold, the core comprising: a first and a second piston bore extension configured to respectively define a piston bore in the first and the second brake caliper; and two or three core contact points that contact the first mold section whereby the first mold section provides vertical support for the core within the mold and one, two or three of the core contact points are optionally surfaces that contact the first mold section, wherein the first and the second brake calipers are arranged vertically in relation to one another during while supplying the suitable casting material; removing the first and second cast brake calipers from the mold, wherein each of the first and second brake calipers include the four lateral data reference surfaces located on one or more surfaces defining a tower window; and machining the first and second cast brake caliper to produce the first and second brake calipers, wherein the first and second brake calipers have respective first and second rotor spaces configured to receive respective first and second brake rotors when the first and second brake calipers are installed on a vehicle.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Brake Caliper

Figure 1:
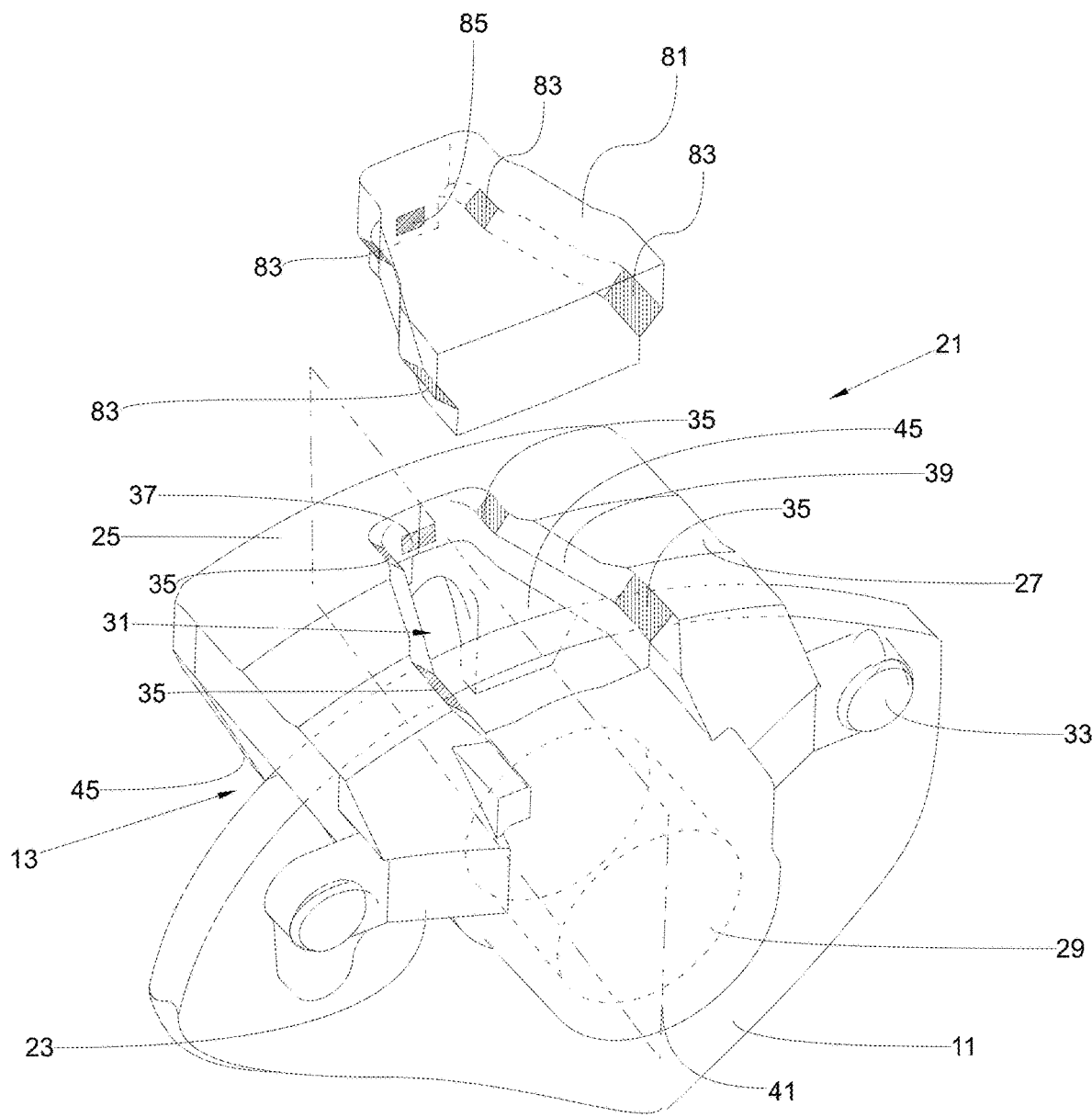
FIG. 1 shows an embodiment of a brake caliper and a portion of a mold.

FIG. 1 shows an embodiment of a brake caliper 21 comprising an inboard leg 23, an outboard leg 25, and a bridge 27 disposed between the inboard leg 23 and the outboard leg 25. Located within the inboard leg 23 is a piston bore 29 configured to receive a piston that can be hydraulically and/or motor and/or lever actuated.

In the bridge 27 is a tower window 31. The tower window can in various embodiments be provided to lighten the weight of the caliper and/or to provide viewing access to various parts of the brake system, such as one or more of the rotor and the inboard and outboard brake pads and backing plates and shims, as desired. Also shown in FIG. 1 are mounting lugs 33 which can be used for mounting the brake caliper within an vehicle for operational use.

Within the tower window 31 are a number of lateral data reference surfaces 35. While four data reference surfaces 35 are shown, a greater or a lesser number can also be present within the tower window 31, such as three or five or six. The lateral data reference surfaces 35 can be used as data reference points for locating and positioning the caliper during machining of the brake caliper 21 to predetermined tolerances. FIG. 1 shows four lateral data reference surfaces 35 arranged around an interior surface 39 of the tower window 31. A vertical plane 41 is also shown in FIG. 1 which divides the brake caliper into a first side and a second side. In FIG. 1, the vertical plane passes through the tower window 31 and the piston bore 29. In some embodiments, the vertical plane 41 can be a plane or symmetry or a plane of partial symmetry of brake caliper 41 (such as where only some features of the brake caliper are arranged symmetrically around the vertical plane 41.) In some embodiments, the vertical plane 41 can define no symmetry of the brake caliper. The vertical plane 41 can also divide the mold and the core into a first side and a second side, where the vertical plane 41 of the brake caliper corresponds to the position of the vertical plane 41 in the mold.

As shown in FIG. 1, in some embodiments, the lateral data reference surfaces 35 can be arranged with one or more on one side of the vertical plane 41 and one or more on the second side of the vertical plane 41. In some embodiments, a longitudinal data reference surface 37 can be present within the tower window 31. In some such embodiments, the vertical plane can pass through the longitudinal data reference surface 37, such as by bisecting the longitudinal data reference surface 37 into two equal or near equal parts. In some embodiments, the longitudinal data reference surface 37 can be located to one side of the vertical plane 41 or the longitudinal data reference surface 37 can be replaced by two or more data reference surfaces, with at least one located to one side of the vertical plane 41 and at least one to the other side.

Figure 3:
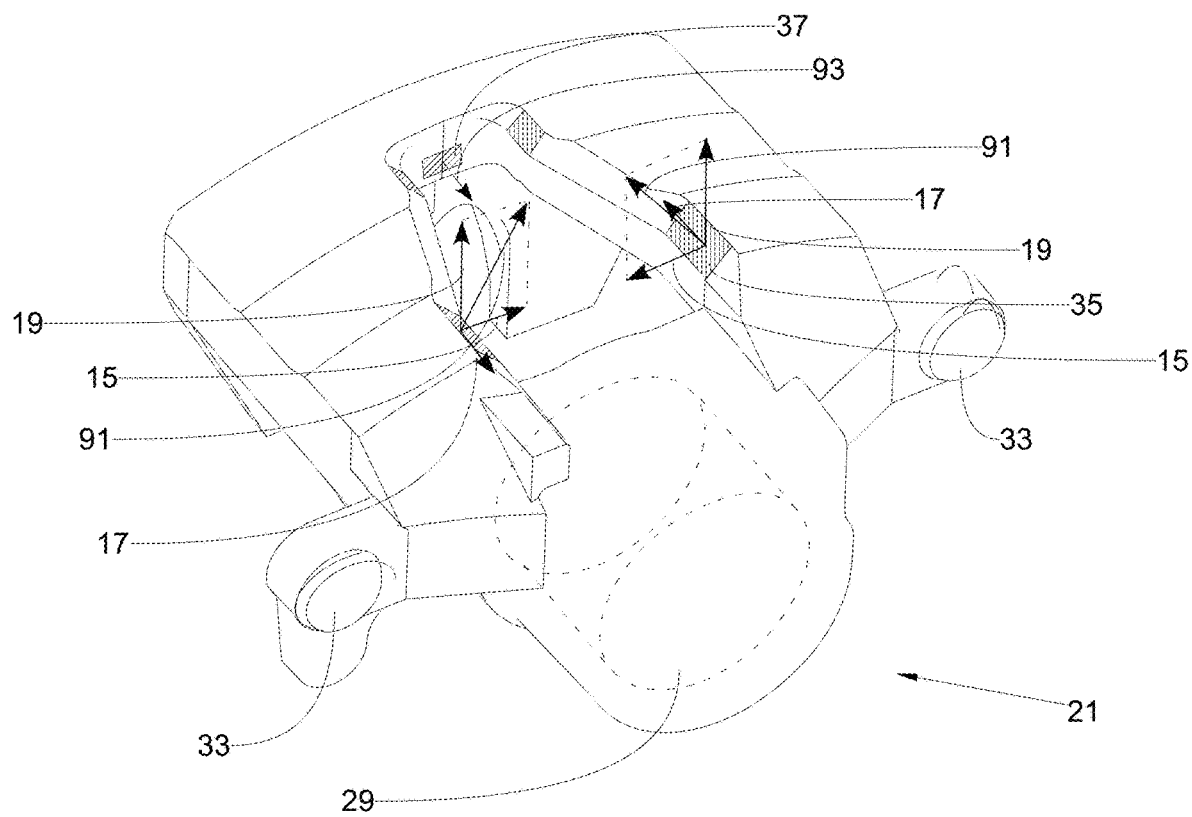
FIG. 3 shows an embodiment of a portion of a brake caliper and a normal vector of a data reference surface.

In various embodiments, the data reference surfaces, such as the lateral data reference surfaces 35 can be oriented at various angles in space. For example, in one embodiment, a normal vector 43 extending from one or more lateral data reference surfaces 35 (see FIG. 3) can have a component along a first axis that is perpendicular to the vertical plane 41 and/or a component along a second axis, perpendicular to a brake rotor 11 present in the rotor space 13 when the brake caliper 21 is installed in a vehicle and/or a component along a third axis that is perpendicular to the first and second axes. In various embodiments, a component of normal vector 43 that is in the third axis can extend upward from the brake caliper 21 (where the fingers 45 extend downward from the caliper.) In some embodiments, one, two, three, four or more of the lateral data reference surfaces 35 can have a normal vector 43 with a component in the first axis and a component in the third axis and no non-zero component in the second axis. In some embodiments, a number of the lateral data reference surfaces 35 can have a normal vector 43 having a component along the first axis and a component along the third axis and no non-zero component in the second axis, while a number of the lateral data reference surfaces 35 can have a normal vector 43 having a component along the first axis, a component along the third axis and a non-zero component along the second axis.

In some embodiments, including but not limited to those discussed above, a longitudinal data reference surface 37 can have a normal vector 44 with components in only the second axis, or only the second and third axis, or only the second and first axis, or in all of the first, second and third axes.

Machining Fixture

Figure 2A:
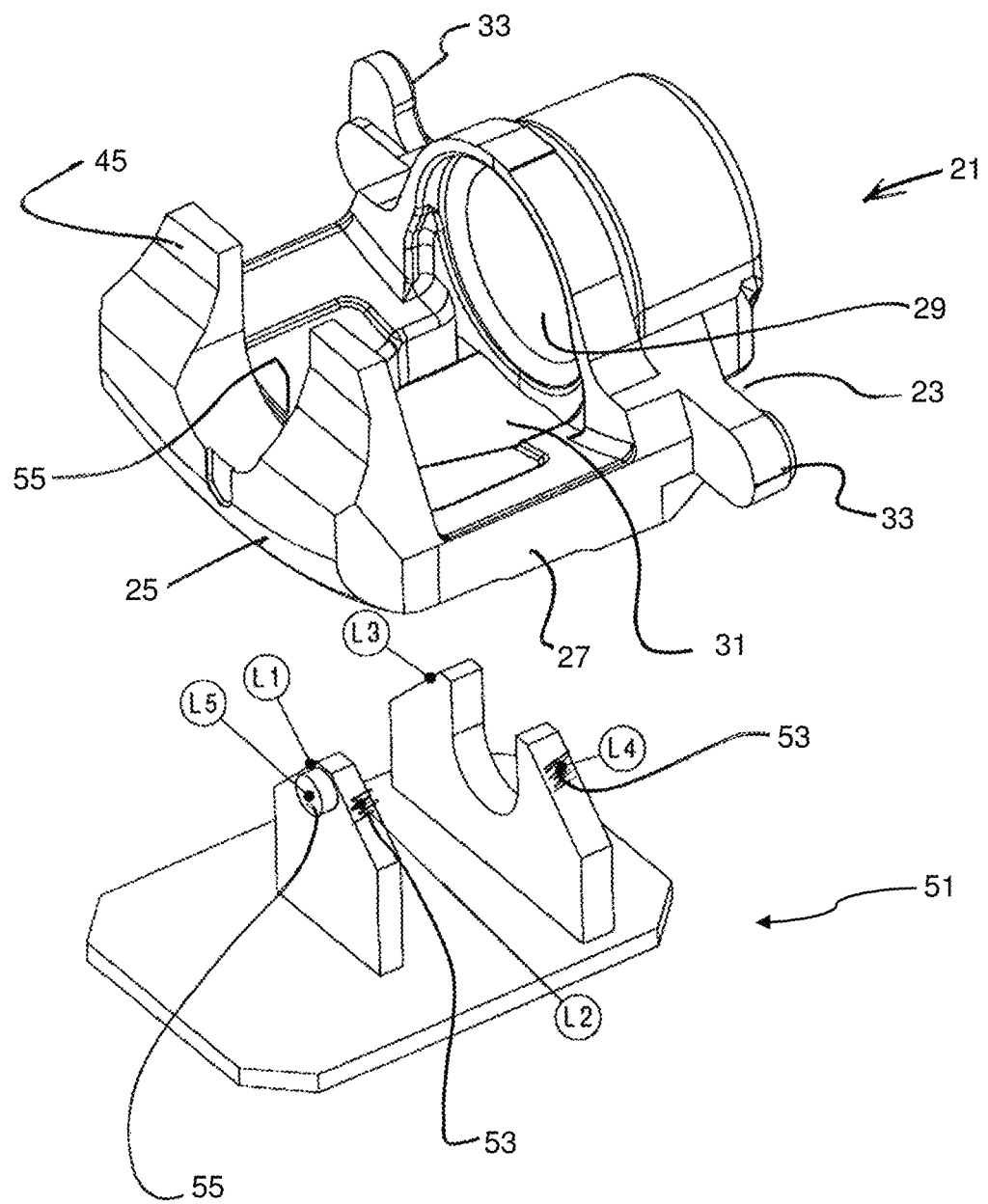
FIG. 2a shows an embodiment of a machining fixture and a brake caliper.

In some embodiments, the brake caliper 21 can be positioned in a machining fixture 51, such as that shown in FIG. 2a. Machining fixture 51 can include lateral data reference stops that correspond to the lateral data reference surfaces 35 of brake caliper 21. In some embodiments, four lateral data reference stops 53 can correspond to four lateral data reference surfaces 35 of brake caliper 21. However, if fewer or more lateral data reference surfaces are present on brake caliper 21, then a correspondingly fewer or greater number of lateral data reference stops 51 can also be present on machining fixture 51.

Figure 2B:
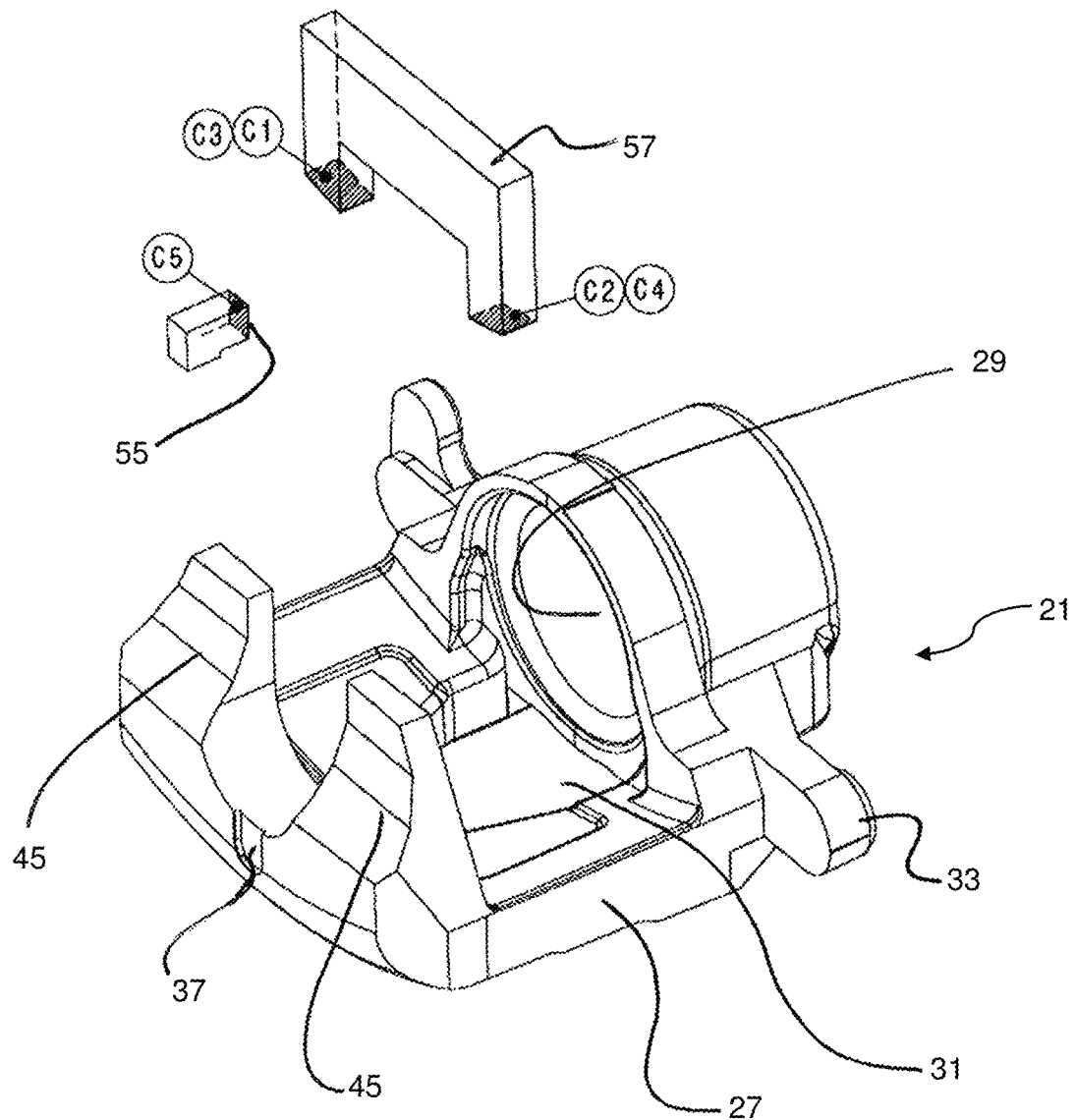
FIG. 2b shows an embodiment of a machining fixture clamp and a brake caliper.

In some embodiments, a longitudinal data reference stop 55 can be present to correspond to the longitudinal data reference surface 37 of brake caliper 21. In some embodiments, longitudinal data reference stop 55 can contact longitudinal data reference surface 37 within tower window 31, and in some embodiments, longitudinal data reference stop 55 can contact longitudinal data reference surface 37 located outside of tower window 31, such as on outboard leg 25 in FIG. 2b. In some embodiments, the lateral data reference stops 53 can define the location of the brake caliper positioned on machining fixture 53 in two dimensions (or three dimensions), and the longitudinal data reference stop 55 can define the brake caliper position in a third dimension.

In use, the brake caliper 21 can be positioned in the machining fixture 51 with the lateral data reference stops 53 contacting the corresponding lateral data reference surfaces 35 and the longitudinal data reference stop 55 contacting the corresponding longitudinal data reference surface 37. Clamp 57 can then be positioned on one or more surfaces of brake caliper 21 to hold brake caliper 21 in place on the machining fixture 51 while various surfaces of brake caliper 21 are machined to the specified dimensions. In some embodiments, two or more clamps can be used to maintain the position of the brake caliper 21 in position on the machining fixture 51.

In some embodiments, the location of the lateral data reference surface stops 53, the longitudinal data reference surface stop 55, the lateral data reference surfaces 35, the longitudinal data reference surface 37 and the clamps can be positioned and designed to provide open spaces to allow machine tools to reach the surfaces required to be machined. In one embodiment, a machine tool can pass between fingers 45, over bridge 27 under claim 57 to access and machine the piston bore 29.

Mold

Figure 4:
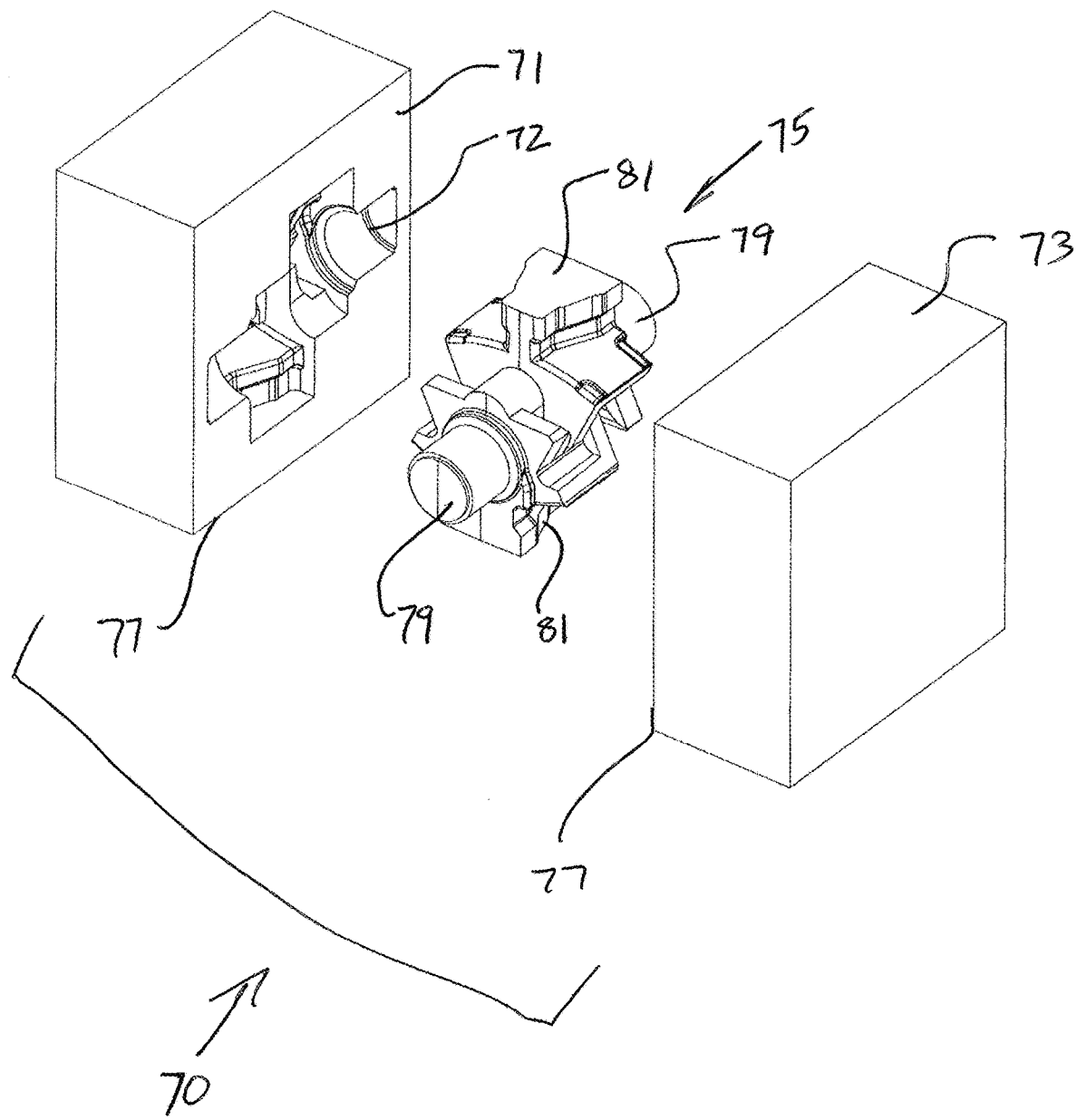
FIG. 4 shows an embodiment of a brake caliper mold.

FIG. 4 shows an embodiment of a mold 70 for producing a brake caliper as discussed herein. In one embodiment, the mold comprises a first mold section 71, a second mold section 73 and a core 75 disposed within the cavity 72 formed by the first mold section 71 and the second mold section 73. In some embodiments, the core 75 can include a piston bore extension 79 configured to form a piston bore 29 of a brake caliper 21, and a tower 81 configured to define a tower window 31 of a brake caliper 21. In some embodiments of a mold, a single brake caliper can be molded within a combination of a first mold section 71, second mold section 73 and core 75. In some embodiments, two brake calipers 21 can be molded simultaneously with a combination of a first mold section 71, second mold section 73 and core 75. In some embodiments of a mold that can simultaneously mold two brake calipers, the core 75 can have two towers 81 and two piston bore extensions 79. As shown in FIG. 4, the core 75 can have two piston bore extensions 79 in an opposed arrangement (where one piston bore extension 79 extends from one end of the core 75 and a second piston bore extension extends from an opposite end of core 75.) Likewise, the core 75 can have two towers 81 extending from opposite sides of core 75 with a first tower 81 extending from one side and a second tower 81 extending from an opposite side of core 75. In various such embodiments, the two piston bore extensions 79 can be aligned collinearly where a central axis for one piston bore extension 79 can be the central axis for the second piston bore extension, or they can be arranged non-collinearly, such as by one being offset from the other vertically and/or horizontally. In some embodiments, the first mold section 71 and second mold section 73 can meet and close at a mold split line 77 which can bisect one or two piston bore extensions 79 and one or two towers 81.

Figure 5:
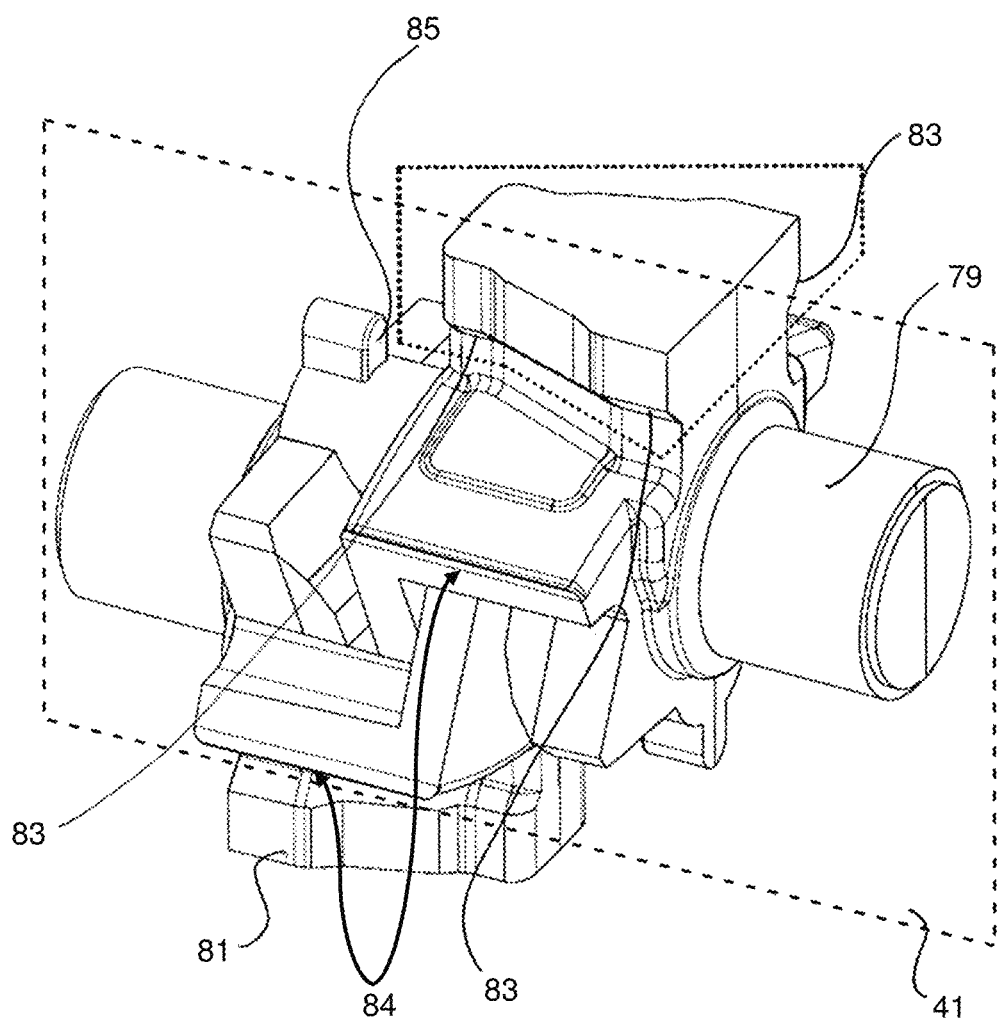
FIG. 5 shows an embodiment of a core.

The tower 81 can include lateral locator forming surfaces 83 that correspond to and form lateral data reference surfaces 35 on brake caliper 21. In some embodiments, such as that shown in FIG. 5 and FIG. 1, the lateral data reference surfaces 35 can be located on an underside of tower 81, such as on the underside of a flanged surface.

The brake caliper produced from the mold can also include a rotor space configured to receive a brake rotor with the brake caliper is installed on a vehicle. The rotor space can be molded by the mold 84 or can be produced otherwise, such as by attachments or by machining. In embodiments, the piston present in the finished piston bore of the brake caliper can, in operation, press against a brake pad, which in turn presses against the brake rotor present in the rotor space with a second brake pad, supported by the fingers, pressing against the opposite side of the brake rotor.

Figure 6:
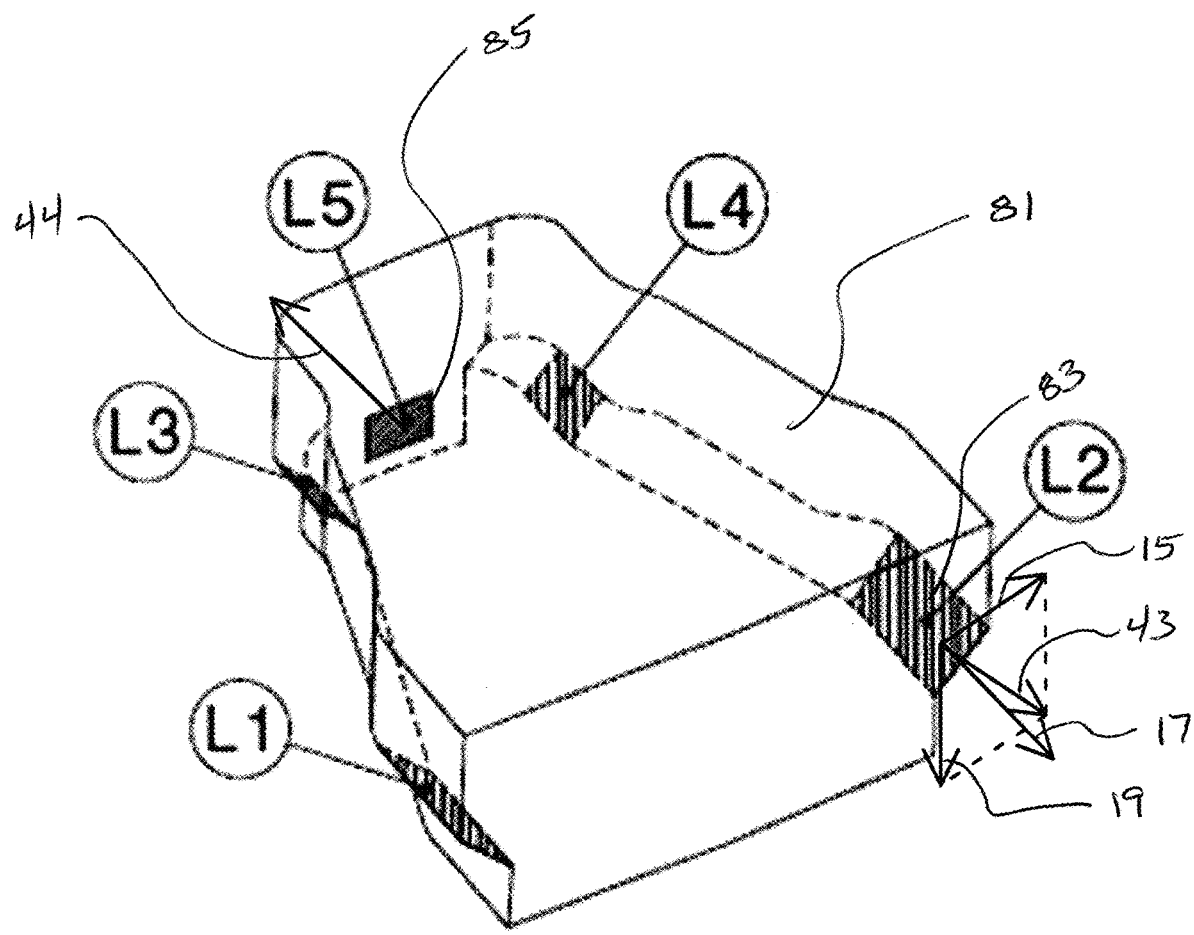
FIG. 6 shows an embodiment of a portion of a mold and a normal vector of a locator forming surface.

In one embodiment, a normal vector 91 extending from a lateral locator forming surface 83 (see FIG. 6) can have a component along a first axis 15 that is perpendicular to the vertical plane 41 and/or a component along a second axis 17, that would be perpendicular to a brake rotor present in the rotor space of the finished brake caliper molded by the mold, when the brake caliper is installed in a vehicle, and/or a component along a third axis 19 that is perpendicular to the first and second axes. In various embodiments, a component of normal vector 91 that is in the third axis can extend downward from the tower 81 (where the tower 81 is above the piston bore extension 79; the piston bore extension 79 is downward from the tower 81.) In some embodiments, one, two, three, four or more of the lateral locator forming surfaces 83 can have a normal vector 91 with a component in the first axis and a component in the third axis and no non-zero component in the second axis In some embodiments, a number of the lateral locator forming surfaces 83 can have a normal vector 91 having a component in the first axis and a component in the third axis and no non-zero component in the second axis, and a number of the lateral locator forming surfaces 83 can have a normal vector 91 having a component in the first axis and a component in the third axis and a non-zero component along the second axis.

In some embodiments, including but not limited to those discussed above, a longitudinal locator forming surface 85 can have a normal vector 93 with components in only the second axis, or only the second and third axis, or only the second and first axis, or in all of the first, second and third axes.

In various embodiments, it can be advantageous to have the same mold component (first mold section 71 or second mold section 73 or core 75) form at least a portion of the data reference surfaces (e.g. lateral and/or longitudinal) and at least a portion of the surfaces to be machined to specification. Having the same mold component form data reference surfaces (e.g. lateral and/or longitudinal) and the surface requiring machining can improve the tolerances of the "as-molded" component such as by eliminating or reducing the chance of as-molded variability due to errors or variability in mold component alignment. Accordingly, preferred embodiments include embodiments where a sufficient number and location of data reference surfaces (e.g. lateral and/or longitudinal) to define the brake caliper's position in the machining fixture are formed by the same mold portion as the piston bore, and a particularly preferred embodiment includes forming a sufficient number and location of data reference surfaces (e.g. lateral and/or longitudinal) to define the brake caliper's position in the machining fixture are formed by the core and the piston bore is formed by the core.

In various embodiments, the core 75 can be supported within the first and second mold sections 71, 73 by interaction of the tower with recesses of the first and second mold sections 71, 73.

Mold Orientation

In various embodiments, brake caliper 21 can be molded individually or can be molded in a coordinated arrangement with additional brake calipers 21. As shown in FIGS. 7a-e and FIGS. 8a-c, in one embodiment, two brake calipers 21 can be molded in a nesting arrangement with a shared core 75. In some embodiments, a series of individual calipers 21 or pairs of brake calipers 21 having shared cores 75 can be arranged in a common mold where a number of individual calipers 21 or pairs of brake calipers 21 can be molded at once within a shared set of first and second mold sections 71, 73.

In some embodiments, the caliper(s) can be arranged in a horizontal orientation (see, for example, FIG. 7c), wherein during molding within the mold, gravity is directed downward and the bridge 27 extends horizontally while the piston inboard leg 23 is positioned horizontally from the outboard leg 25, and the core is positioned horizontally. In some embodiments, the caliper(s) can be arranged in a vertical orientation (for example, see FIG. 7e, where a vertical orientation is indicated, but the drawing has been turned 90° from the vertical) wherein during molding within the mold, gravity is directed downward and the bridge 27 extends vertically while the piston inboard leg 23 is positioned vertically from the outboard leg 25, and the core is positioned vertically.

In some embodiments, a pair of brake calipers 21 having a shared core 75 can be positioned horizontally or vertically with the fingers 45 of each caliper 21 extending into or adjacent to the rotor space 13, or with the bridge 27 of one caliper 21 being parallel or approximately parallel to the bridge 27 of the other caliper 21.

Various embodiments of a caliper mold to produce individual brake calipers 21 or pairs of brake calipers 21 with shared core 75 can have a core 75 that can be placed into one mold section 71 or 73, prior to closing the mold (for example by bringing the second mold section 73 against the first mold section 71 in preparation for introducing molding material into the mold), wherein the core 75 is held in place by sufficient contact points between the mold section the core 75 is placed into and the core, appropriately distributed so that the core does not move out of position when the mold is closed. In some embodiments, additional contact points on the other mold section can move into position against the core 75 to additionally hold the core 75 in place within the first and second mold sections 71, 73. In various embodiments, the contact points of one mold section and/or both mold sections can hold the core 75 in position during the molding operation including the during introduction of molding material into the mold and movement of the mold before or after introduction of molding material into the mold.

In some embodiments, contact points on the core 75 can provide vertical support and/or horizontal support for the core. (While the phrase "contact point" has been used, it is to be understood that the "contact point" can be a point or a surface or a line, and such surfaces and lines can be straight, flat or curved or of any suitable shape.) In some preferred embodiments, such as that shown in FIG. 7c, potential contact points can be provided on the top of the tower 101, the front of the tower 102, the back of the tower 103, adjacent the fingers 104, along a first ridge (or protrusion) 105 extending from the fingers 45 of one caliper 21 to a motor lug 34 of the other caliper 21 (or from a portion of the core 75 defining a space between the fingers 45 of one caliper 21 to a motor lug 34 of the other caliper 21), at an end of the first ridge (or protrusion) 106 that is optionally between two motor lugs 34 or alongside one or more motor lugs 34, along a second ridge (or protrusion) 107 that extends from the tower or a position adjacent to the tower of one caliper to a motor lug 34 of the other brake caliper 21, along lateral surfaces of the tower 108, along lateral surfaces of the second ridge (or protrusion) 109, along lateral surfaces of the first ridge (or protrusion) 110, along lateral surfaces of the portion of the core extending with the rotor space 111 along lateral surfaces of portions of the core adjacent the fingers 112. Generally, a contact point on the core is on a portion of the core where a surface of the core is not obscured by a portion of a caliper after molding (and therefore not obscured by a portion of the mold that will contain introduced molding material) from interfacing with the first or second mold section. Contact points can be surfaces that are vertical or horizontal or a combination thereof (with horizontal and vertical defined with gravity during molding being downward), with the core oriented vertically or horizontally.

In embodiments where brake calipers are cast with optional motor lugs 34 for mounting a motor for operating a parking brake or a service brake, one or more motor lugs 34 can be present on the brake caliper 21. In preferred embodiments, two or three motor lugs 34 can be used, such as where a motor lug extends from a portion of the inboard leg 23, such as a portion that encloses the piston bore 29 or a rear portion of the piston bore 29 (located distal the fingers 45), such as are shown in FIGS. 7a-e.

Figure 7A:
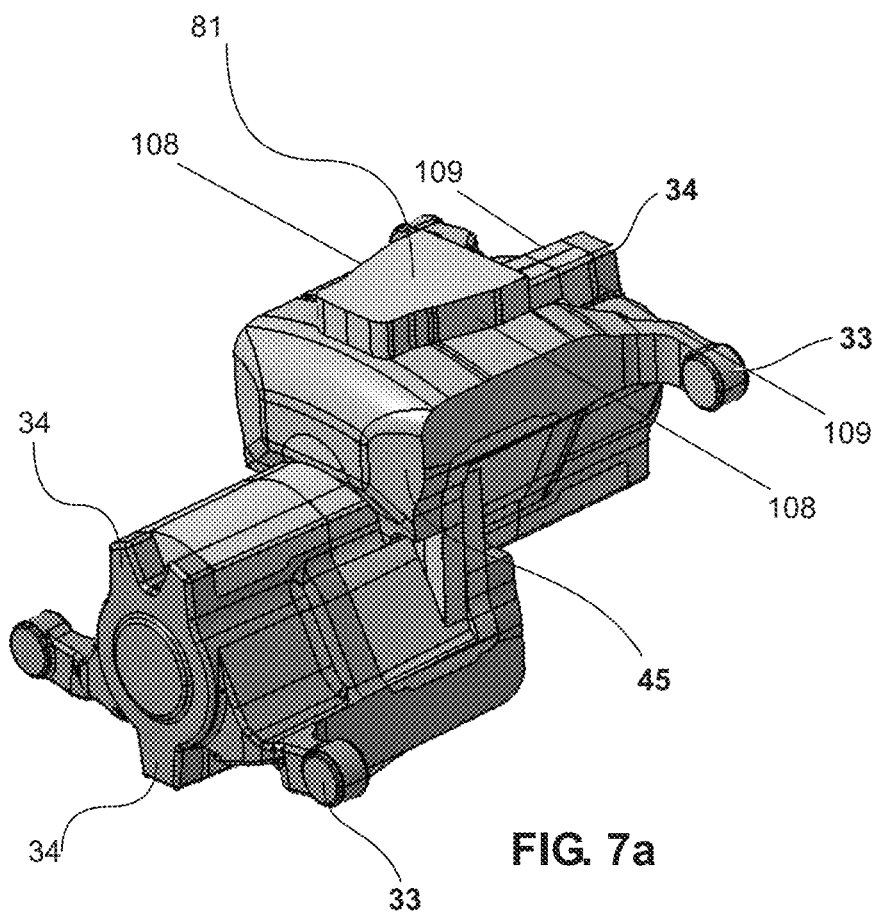
FIG. 7a-e show various views of an embodiment of two calipers with a shared core.
Figure 7B:
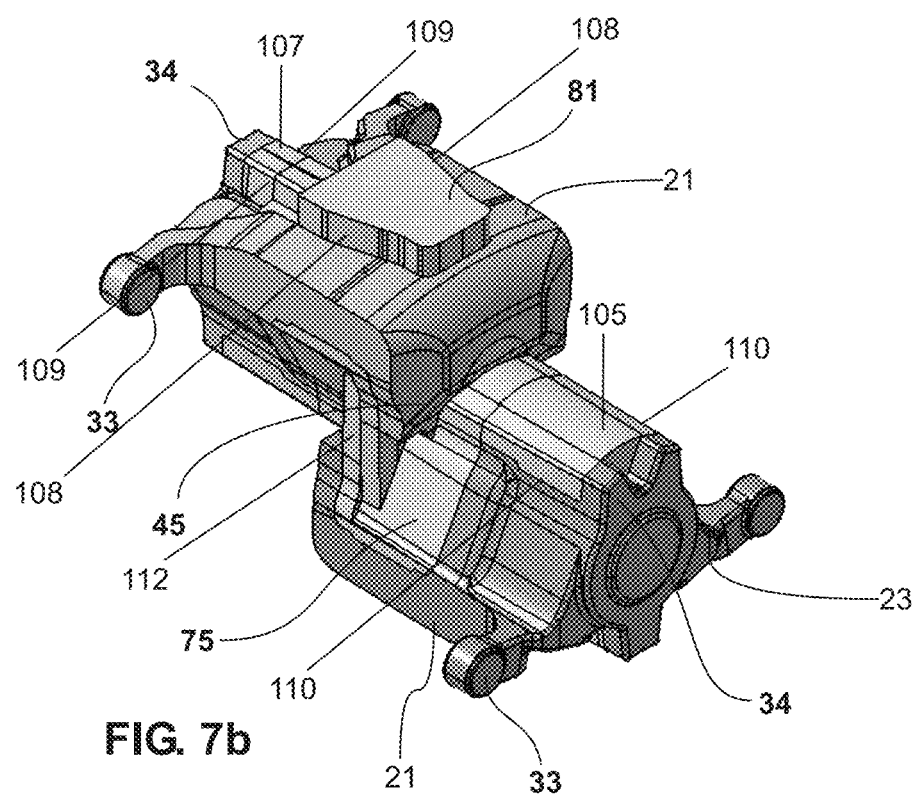
Figure 7C:
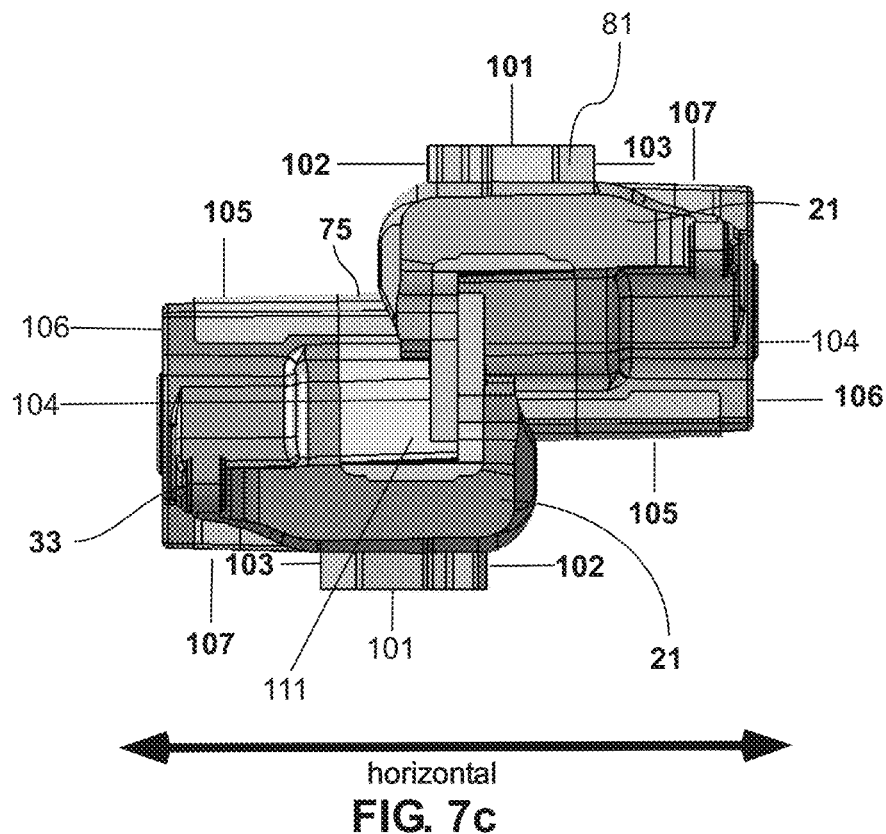
Figure 7D:
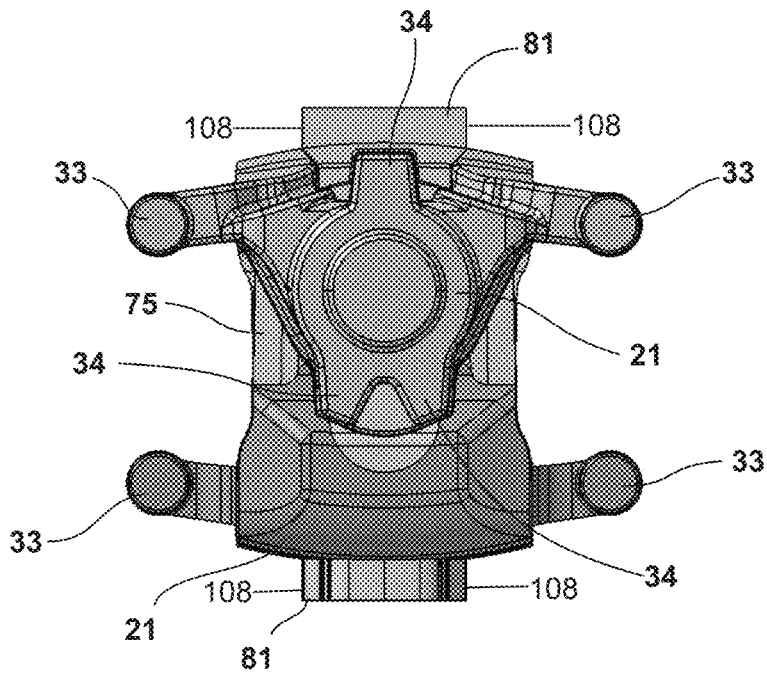
Figure 7E:
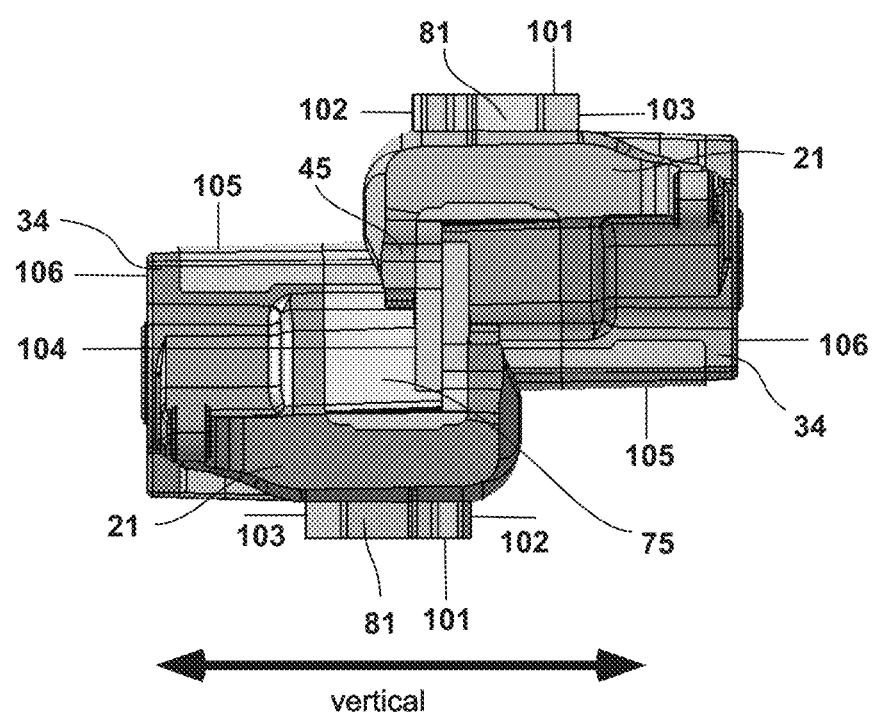

As shown in FIG. 7b, the first ridge (or protrusion) 105 of the core or an end of the first ridge (or protrusion) 106 can be used to form a back side of a motor lug 34 or the backside of a plurality of motor lugs 34 located on a portion of the inboard leg 23 that encloses a rear portion of the piston bore 29, extending in the same direction as the tower 81 that forms the window 31 of the caliper. Also as shown in FIG. 7b, the second ridge (or protrusion) 107 can be used to form the backside of a motor lug 34 or the backside of a plurality of motor lugs 34 located on a portion of the inboard leg 23 that encloses a rear portion of the piston bore 29 extending in the opposite direction of the tower 81 that forms the window 31 of the caliper 21. In some embodiments, the arrangement of the core and mold sections can be arranged to for the core to form the backside of one or more motor lugs 34, such as described herein, and in some such embodiments, the arrangement can lead to less or fewer molding flashing (or fins) extending from the desired part through a mold joint or split line that requires subsequent removal, over molding where the entirety of the motor lug 34 is formed by the first and second mold sections and not the core 75. Accordingly, forming the backside of the motor lug(s) 34 with the core 75 or with a first or second ridge (or protrusion) of the core 105, 107 can lead to reduced losses and reduced machine operation to produce a final brake caliper 21.

In some embodiments all of the potential contact points on the core can be used and in some embodiments, only a portion of the potential contact points on the core can be used. In preferred embodiments, contact points can be distributed around a center of mass of the core 75, as positioned within the mold section 71, 73 which the core is initially placed. In some embodiments, three core contact points can contact the mold section 71, 73 which the core is initially placed. In some embodiments, four, five, six, seven or more core contact points can contact the mold section 71, 73 which the core is initially placed. In some embodiments, at least one of the core contact points in contact with the mold section 71, 73 which the core is initially placed can provide vertical support to the core from the mold section. In some embodiments, at least two of the core contact points in contact with the mold section 71, 73 which the core is initially placed can provide vertical support to the core from the mold section. In some embodiments, at least three of the core contact points in contact with the mold section 71, 73 which the core is initially placed can provide vertical support to the core from the mold section. In some embodiments, at least one of the core contact points in contact with the mold section 71, 73 which the core is initially placed can provide horizontal support to the core from the mold section. In some embodiments, at least two of the core contact points in contact with the mold section 71, 73 which the core is initially placed can provide horizontal support to the core from the mold section. In some embodiments, at least three of the core contact points in contact with the mold section 71, 73 which the core is initially placed can provide horizontal support to the core from the mold section.

While the core 75, first and second mold sections 71, 73 producing pairs of calipers 21 having shared cores 75 can be oriented horizontally utilizing core contact points as discussed herein, in some embodiments, a higher density of brake calipers within a mold (e.g. brake calipers per square meter, such as where multiple pairs are produced in a single molding operation) can be achieved when the core 75, first and second mold sections 71, 73 producing pairs of calipers 21 are arranged vertically, which can lead to reduced molding cost on a per caliper basis. In various embodiments of molding pairs of calipers 21 having shared cores 75 in the vertical orientation, core contact points can preferably include a contact point at the front of the tower 102 of one caliper 21 and a contact point at the back of the tower 103 of the other brake caliper 21. Preferred embodiments can further optionally include contact points along the lateral surfaces of the tower 108 one or both calipers 21.

Figure 8A:
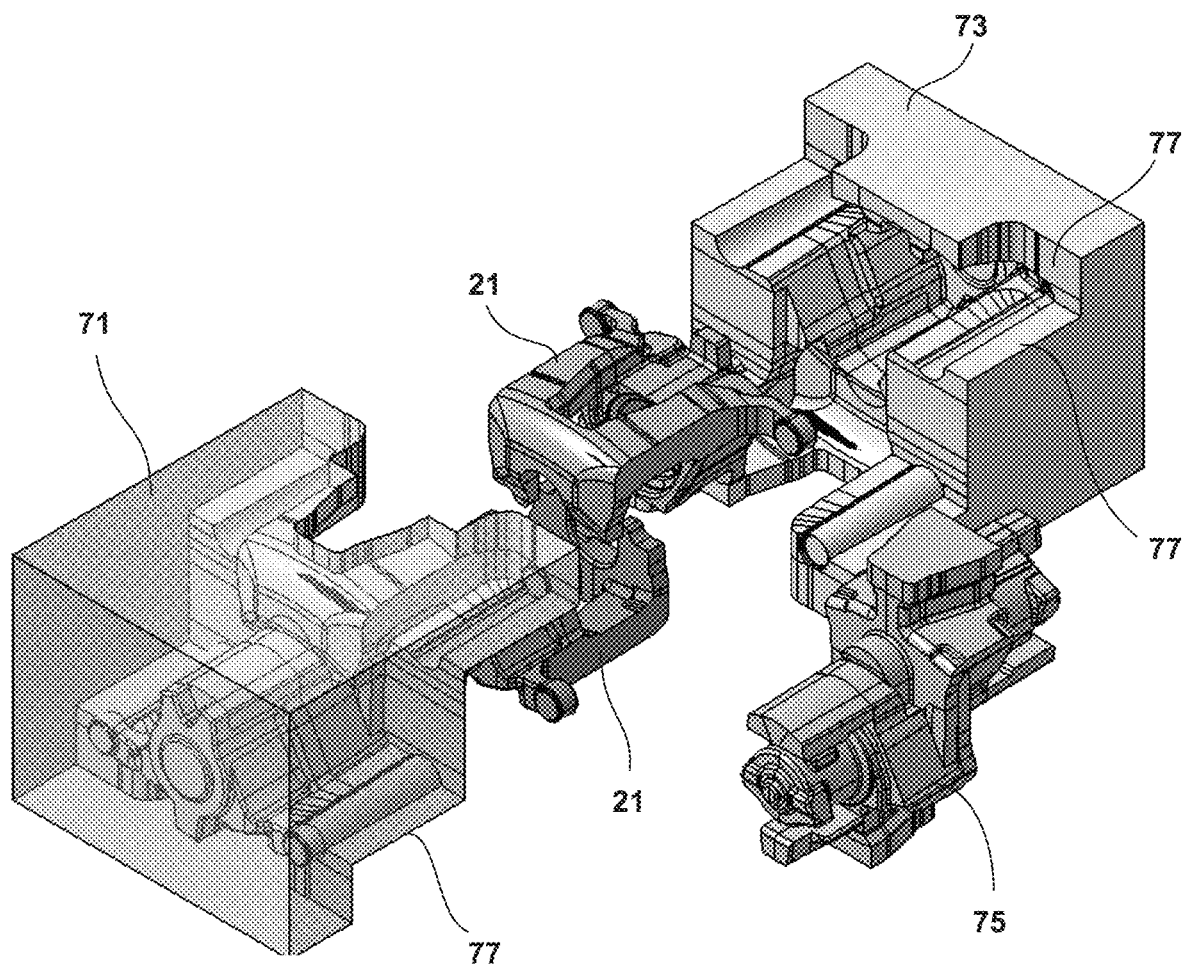
FIG. 8a-c show various views of an embodiment of caliper(s), core and first and second mold sections.
Figure 8B:
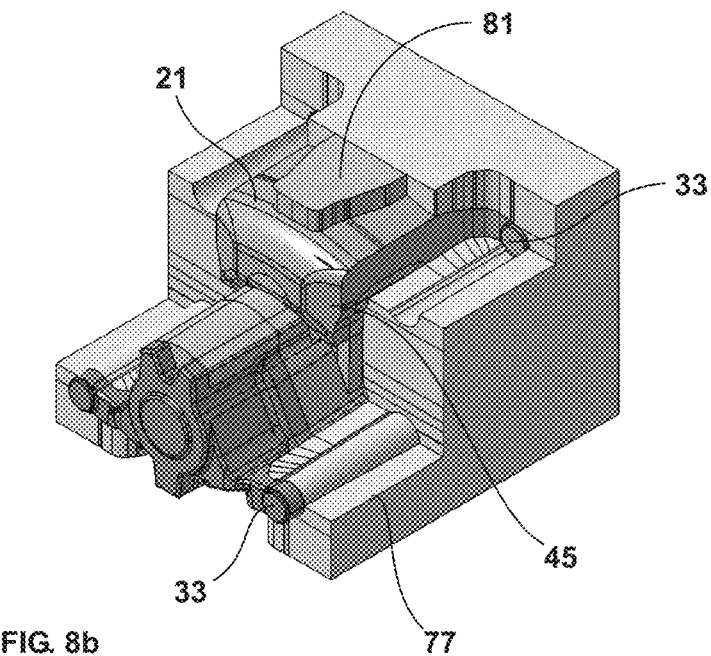
Figure 8C:
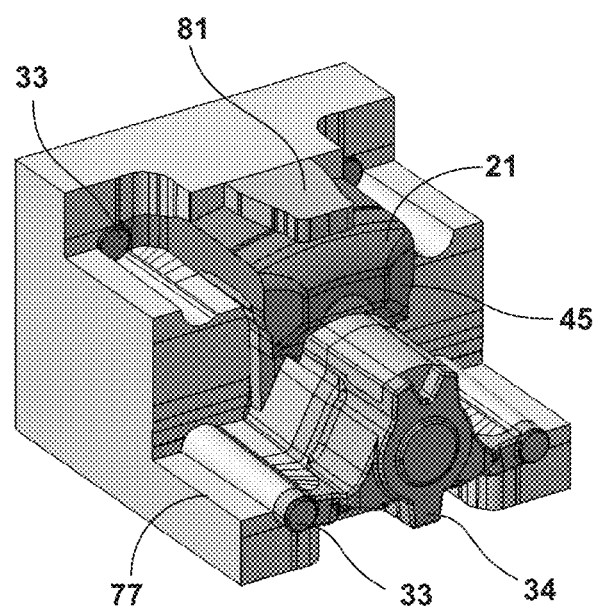

In various embodiments of molds for molding pairs of calipers having a shared core 75, such as where the pair of calipers 21 are arranged vertically, the first and second mold sections 71, 73 when closed can meet at a split line 77, such as that shown in FIG. 8a. (FIGS. 8a-c are shown turned from a vertical orientation to more easily show the relationship of the parts, but the details of a vertical orientation can be understood considering this rotation of the parts.) In this embodiment, the mold split line 77 includes horizontal and vertical portions resulting in a stepped shape. In this embodiment, the split line 77 adjacent to each caliper proceeds adjacent to a midpoint of the mounting lug 33 of one caliper 21, turning approximately 90° after passing the fingers 45 of the second caliper 21 and then turning again approximately 90° to follow a line or curve adjacent to a lower edge of the bridge 27 of the second caliper 21 and adjacent to a midpoint of mounting lug 33 of the second caliper 21. In some related embodiments, one or more of the angles between the segments described can vary from 90° to facilitate closure of the mold, such as to reduce sliding of one mold section against the other mold section or to reduce the risk of one mold section sliding along or pushing out of position the core. In some embodiments where there are two vertical segments, it can be desirable to select the angles to result in the two vertical sections being parallel or near parallel to one another.

Molding

In various embodiments of making a brake caliper, a mold 70 comprising a first mold section 71 and a second mold section 73 which meet at a split line 77, and having a core 75 disposed within the cavity formed by the first mold section 71 and the second mold section 73, can be prepared, followed by admitting a liquid molding material, such as a molten metal or other material that can solidify within the mold, allowing the liquid molding material to solidify as one or more molded brake calipers 21. Releasing the molded brake caliper(s) 21 from the mold 70. Machining surfaces of the molded brake caliper(s) 21 to specification. In some embodiments, the molded brake caliper 21 can be positioned on a machining fixture 51 for machining the surfaces to specification.

In various embodiments, suitable molding material can include steel, bronze, brass, iron, aluminum, polymers (thermoplastic or thermosetting), magnesium, as well as other metals and other materials which can be melted to a liquid and then hardened, such as by cooling or by reaction.

As used herein, the words "approximately", "about", "near" and other similar words and phrasings are to be understood by a person of skill in the art as allowing for an amount of variation not substantially affecting the working of the device, example or embodiment. In those situations where further guidance is necessary, the degree of variation should be understood as being 7%.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims.

We claim:

1. A brake caliper mold for molding a brake caliper, the brake caliper mold comprising:
   a first mold section;
   a second section half;
   a core member configured to form a piston bore, the core member comprising:
      a tower configured to form a tower window in a bridge of the brake caliper and
      a piston bore extension to form a piston bore of the brake caliper; and
      four lateral locator forming surfaces located on the tower, each of the four lateral locator forming surfaces configured to form a separate lateral data reference surface on the brake caliper, the lateral data reference surfaces capable of being used for subsequent machining of the brake caliper to predetermined tolerances,
      wherein, the brake caliper mold is configured to form a rotor space in the brake caliper wherein a brake rotor is received when the brake caliper is installed on a vehicle.

2. The brake caliper mold of claim 1, the core member further comprising a longitudinal locator forming surface configured to form a separate longitudinal data reference surface on the brake caliper, the longitudinal data reference surface capable of being used for subsequent machining of the brake caliper to predetermined tolerances.

3. The brake caliper mold of claim 2, wherein a vertical plane passing through the core and dividing the tower into a first side and a second side, and passing through the piston bore extension and dividing the piston bore extension into a first side and a second side forms a plane of symmetry for the four lateral locator forming surfaces, with two of the lateral locator forming surfaces lying in the first side of the tower and two of the lateral locator forming surfaces lying on the second side of the tower, and the vertical plane passes through the longitudinal locator forming surfaces.

4. The brake caliper mold of claim 3, wherein the vertical plane bisects the longitudinal locator forming surface.

5. The brake caliper mold of claim 1, wherein a vertical plane passing through the core and dividing the tower into a first side and a second side, and passing through the piston bore extension and dividing the piston bore extension into a first side and a second side and forms a plane of symmetry for the four lateral locator forming surfaces, with two of the lateral locator forming surfaces lying in the first side of the tower and two of the lateral locator forming surfaces lying on the second side of the tower.

6. The brake caliper mold of claim 5, wherein normal vectors extending from each of the four lateral locator forming surfaces have components lying in a common set of axes, wherein the common set of axes has a first axis that is perpendicular to the vertical plane, a second axis is perpendicular to the brake rotor that is present in the rotor space when the brake caliper is installed in a vehicle and a third axis that is perpendicular to the first and second axes, and the normal vector of two of the lateral locator forming surfaces have components only in the first and third axes.

7. The brake caliper mold of claim 6, wherein a normal vector extending from one of the four lateral locator forming surfaces has a component that is in the second axis.

8. The brake caliper mold of claim 1, wherein the core member further comprises a longitudinal locator forming surface configured to form a separate longitudinal data reference surface on the brake caliper, the longitudinal data reference surface capable of being used for subsequent machining of the brake caliper to predetermined tolerances located on an extension of the core member and the longitudinal locator forming surface faces the tower.

9. The brake caliper mold of claim 1, further configured for molding a second brake caliper simultaneous to the molding of the first brake caliper, wherein the core member is configured to define a piston bore for the second brake caliper, and is configured to define four lateral locator forming surfaces located on the tower for the first brake caliper and to define four lateral locator forming surfaces located on the tower of the second brake caliper.

10. The brake caliper mold of claim 1, wherein the brake caliper comprises:
    inboard and outboard legs connected by the bridge and having a rotor space between the inboard and outboard legs configured to receive the brake rotor when the caliper is installed on the vehicle,
    wherein the inboard leg comprises the piston bore and the outboard leg comprises fingers configured to hold a brake pad;
    the bridge comprising the tower window, the tower window being defined by interior surfaces, the tower window having the four lateral data reference surfaces present on the interior surfaces capable of being used for machining of the brake caliper to predetermined tolerances.

11. The brake caliper mold of claim 10, wherein the brake caliper further comprises a longitudinal data reference surface capable of being used for machining of the brake caliper to predetermined tolerances.

12. The brake caliper mold of claim 11, wherein a vertical plane passing through the brake caliper and dividing the tower window into a first side and a second side, and passing through the piston bore and dividing the piston bore into a first side and a second side forms a plane of symmetry for the four lateral data reference surfaces, with two of the lateral data reference surfaces lying in the first side of the tower window and two of the lateral data reference surfaces lying on the second side of the tower window, and the vertical plane passes through the longitudinal data reference surface.

13. The brake caliper mold of claim 12, wherein the vertical plane bisects the longitudinal data reference surface.

14. The brake caliper mold of claim 10, wherein a vertical plane passing through the brake caliper and dividing the tower window into a first side and a second side, and passing through the piston bore and dividing the piston bore into a first side and a second side and forms a plane of symmetry for the four lateral data reference surfaces, with two of the lateral data reference surfaces lying in the first side of the tower window and two of the lateral data reference surfaces lying on the second side of the tower window.

15. The brake caliper mold of claim 14, wherein normal vectors extending from each of the four lateral data reference surfaces have components lying in a common set of axes, wherein the common set of axes has a first axis that is perpendicular to the vertical plane, a second axis is perpendicular to the brake rotor that is present in the rotor space with the brake caliper is installed on a vehicle and a third axis that is perpendicular to the first and second axes, and the normal vector of two of the lateral data reference surfaces have components only in the first and third axes.

16. The brake caliper mold of claim 15, wherein a normal vector extending from one of the four lateral data reference surfaces has a component that is in the second axis.

17. The brake caliper mold of claim 14, wherein the core member further comprises a longitudinal data reference surface, the longitudinal data reference surface capable of being used for subsequent machining of the brake caliper to predetermined tolerances, the longitudinal data reference surface located on the bridge and a normal vector to the longitudinal data reference surface faces away from the tower and is parallel to the plane of symmetry.

18. A method of producing a brake caliper, the method comprising:
    supplying a suitable casting material to a mold so as to form a cast brake caliper within the mold, wherein, the mold comprises:
    a first mold section; and
    a second mold section meeting at a split line, wherein a core is disposed within the mold, the core comprising:
    a tower configured to define a window in a bridge of the cast brake caliper and a piston bore extension configured to define a piston bore of the cast brake caliper, the tower comprising:
    four lateral locator forming surfaces, each of the four lateral locator forming surfaces configured to form a separate lateral data reference surface on the cast brake caliper, the lateral data reference surfaces capable of being used for subsequent machining of the cast brake caliper to predetermined tolerances; and
    removing the cast brake caliper from the mold, wherein the cast brake caliper includes the four lateral data reference surfaces located on one or more surfaces defining a tower window; and
    machining the cast brake caliper using the four lateral data reference surfaces as datum surfaces to thereby produce the brake caliper,
    wherein the brake caliper has a rotor space configured to receive a brake rotor when the caliper is installed on a vehicle.

19. The method of claim 18, the core member further comprising a longitudinal locator forming surface configured to form a separate longitudinal data reference surface on the brake caliper, the longitudinal data reference surface capable of being used for subsequent machining of the brake caliper to predetermined tolerances.

20. The brake caliper mold of claim 19, wherein a vertical plane passing through the core and dividing the tower into a first side and a second side, and passing through the piston bore and dividing the piston bore into a first side and a second side forms a plane of symmetry for the four lateral locator forming surfaces, with two of the lateral locator forming surfaces lying in the first side of the tower and two of the lateral locator forming surfaces lying on the second side of the tower, and the vertical plane passes through the longitudinal locator forming surface.

21. The brake caliper mold of claim 20, wherein the vertical plane bisects the longitudinal locator forming surface.

22. The method of claim 18, wherein a vertical plane passing through the core and dividing the tower into a first side and a second side, and passing through the piston bore and dividing the piston bore into a first side and a second side and forms a plane of symmetry for the four lateral locator forming surfaces, with two of the lateral locator forming surfaces lying in the first side of the tower and two of the lateral locator forming surfaces lying on the second side of the tower.

23. The method of claim 22, wherein normal vectors extending from each of the four lateral locator forming surfaces have a components lying in a common set of axes, wherein the common set of axes has a first axis that is perpendicular to the vertical plane, a second axis is perpendicular to the brake rotor that is present in the rotor space when the brake caliper is installed in a vehicle and a third axis that is perpendicular to the first and second axes, and the normal vector of two of the lateral locator forming surfaces have components only in the first and third axes.

24. The brake caliper mold of claim 23, wherein a normal vector extending from one of the four lateral locator forming surfaces has a component that is in the second axis.

25. The brake caliper mold of claim 18, wherein the core member further comprises a longitudinal locator forming surface configured to form a separate longitudinal data reference surface on the brake caliper, the longitudinal data reference surface capable of being used for subsequent machining of the brake caliper to predetermined tolerances located on an extension of the core member and the longitudinal locator forming surface faces the tower.

26. The brake caliper mold of claim 18, further configured for molding a second brake caliper simultaneous to the molding of the first brake caliper, wherein the core member is configured to define the piston bore for the second brake caliper, and is configured to define four lateral locator forming surfaces located on the tower for the first brake caliper and to define four lateral locator forming surfaces located on the tower of the second brake caliper.

27. A method of producing a pair of brake calipers, the method comprising:
supplying a suitable casting material to a mold so as to form a first and a second cast brake caliper within the mold, wherein, the mold comprises:
a first mold section; and
a second mold section meeting at a split line, wherein a core is disposed within the mold, the core comprising:
a first and a second piston bore extension configured to respectively define a piston bore in the first and the second brake caliper; and
two core contact points that contact the first mold section whereby the first mold section provides vertical support for the core within the mold,
wherein the first and the second brake calipers are arranged vertically in relation to one another during while supplying the suitable casting material;
removing the first and second cast brake calipers from the mold, wherein each of the first and second brake calipers include the four lateral data reference surfaces located on one or more surfaces defining a tower window; and
machining the first and second cast brake caliper to produce the first and second brake calipers,
wherein the first and second brake calipers have respective first and second rotor spaces configured to receive respective first and second brake rotors when the first and second brake calipers are installed on a vehicle.

28. The method of claim 27, wherein the core further comprises:
first and second towers configured to define respective first and second windows in respective first and second bridges of respective first and second cast brake calipers, wherein each of the first and second towers comprises:
four lateral locator forming surfaces, each of the four lateral locator forming surfaces configured to form a separate lateral data reference surface on the respective first and second cast brake calipers, the lateral data reference surfaces capable of being used for subsequent machining of the respective first and second cast brake calipers to predetermined tolerances; and
machining the each of the first and second cast brake calipers using the respective four lateral data reference surfaces as datum surfaces to thereby produce the first and second brake calipers.

29. The method of claim 27, wherein the core further comprises:
a first ridge extending from a portion of the core configured to define a space between fingers on an outboard leg of second cast brake caliper to a location proximate the inboard leg of the first cast brake caliper, and an end of the first ridge defining a first motor lug; and
a second ridge and a first tower, the first tower configured to define the tower window of the first cast brake caliper and the second ridge extending from the first tower to a location proximate the inboard leg of the first cast brake caliper, and an end of the second ridge defining a second motor lug.

* * * * *